United States Patent
Martins Junior et al.

(10) Patent No.: US 11,820,879 B2
(45) Date of Patent: *Nov. 21, 2023

(54) CONTINUOUS FEED OF ANTISTATIC AGENT FOR GAS PHASE POLYMERIZATION PROCESS

(71) Applicant: Braskem S.A., Camaçari (BR)

(72) Inventors: Olavo Martins Junior, São Paulo (BR); Dihogenes Adriano Pozzer, São Paulo (BR); Élita Cavalli, São Paulo (BR); Adriano Giraldi Fisch, São Paulo (BR); Roberto Osório Jimenez, São Paulo (BR)

(73) Assignee: Braskem S.A., Camaçari (BR)

( * ) Notice: Subject to any disclaimer, the term of this patent is extended or adjusted under 35 U.S.C. 154(b) by 461 days.

This patent is subject to a terminal disclaimer.

(21) Appl. No.: 16/728,802

(22) Filed: Dec. 27, 2019

(65) Prior Publication Data

US 2020/0207951 A1 Jul. 2, 2020

Related U.S. Application Data

(60) Provisional application No. 62/785,846, filed on Dec. 28, 2018.

(51) Int. Cl.
*C08K 5/56* (2006.01)
*C07F 5/06* (2006.01)
(Continued)

(52) U.S. Cl.
CPC ............... *C08K 5/56* (2013.01); *C07F 5/062* (2013.01); *C08F 10/02* (2013.01); *C08F 10/06* (2013.01); *C08K 2201/001* (2013.01)

(58) Field of Classification Search
CPC ..... C08K 5/56; C08K 2201/001; C07F 5/062; C08F 10/02; C08F 10/06
See application file for complete search history.

(56) References Cited

U.S. PATENT DOCUMENTS 3,917,466 A 11/1975 Henry, Jr.
4,416,668 A 11/1983 Thompson
(Continued)

FOREIGN PATENT DOCUMENTS

CN 101443398 A 5/2009
CN 107189172 A 9/2017
(Continued)

OTHER PUBLICATIONS

Office Action issued in U.S. Appl. No. 16/729,032, dated Apr. 5, 2021 (12 pages).
(Continued)

*Primary Examiner* — John E Uselding
(74) *Attorney, Agent, or Firm* — Osha Bergman Watanabe & Burton LLP (57) ABSTRACT

Methods may include reacting an antistatic agent with at least one alkylaluminum to form an antistatic complex, and may further include feeding the antistatic complex into a polymerization process. Methods of using an antistatic agent in a polymerization process may include feeding the antistatic agent into the polymerization process and, subsequently, reacting the antistatic agent with at least one alkylaluminum.

34 Claims, 5 Drawing Sheets

(51) Int. Cl.
*C08F 10/02* (2006.01)
*C08F 10/06* (2006.01)

(56) References Cited

U.S. PATENT DOCUMENTS

| | | | |
|---|---|---|---|
| 4,792,592 | A | 12/1988 | Fulks et al. |
| 4,803,251 | A | 2/1989 | Goode et al. |
| 4,855,370 | A | 8/1989 | Chirillo et al. |
| 5,026,795 | A | 6/1991 | Hogan |
| 5,391,657 | A | 2/1995 | Song et al. |
| 5,712,352 | A | 1/1998 | Brant et al. |
| 6,201,076 | B1 | 3/2001 | Etherton et al. |
| 6,476,165 | B1 | 11/2002 | Wang |
| 7,838,607 | B2 | 11/2010 | Mihan |
| 8,017,703 | B2 | 9/2011 | Schwind et al. |
| 8,568,845 | B2 | 10/2013 | Malm et al. |
| 8,865,847 | B2 | 10/2014 | Hoang et al. |
| 8,957,167 | B2 | 2/2015 | Hussein et al. |
| 9,332,465 | B2 | 5/2016 | Valliappan et al. |
| 9,771,439 | B2 | 9/2017 | Mihan et al. |
| 11,352,375 | B2* | 6/2022 | Martins Junior ....... C07F 5/069 |
| 2009/0105428 | A1* | 4/2009 | Mihan ..................... C07F 5/069 528/391 |
| 2012/0041162 | A1 | 2/2012 | Tohi et al. |
| 2012/0245314 | A1* | 9/2012 | Caputo ................ C08K 5/1515 526/204 |
| 2012/0283369 | A1* | 11/2012 | Koelling ................. C08F 10/00 524/157 |
| 2016/0208026 | A1 | 7/2016 | Covezzi et al. |

FOREIGN PATENT DOCUMENTS

| | | |
|---|---|---|
| CN | 107641206 A | 1/2018 |
| CN | 103881338 B | 10/2018 |
| DE | 19615953 A1 | 10/1997 |
| EP | 0 453 116 A1 | 10/1991 |
| EP | 1255783 B1 | 12/2005 |
| EP | 1252198 B1 | 8/2012 |
| EP | 2811638 A1 | 12/2014 |
| EP | 3034519 A1 | 6/2016 |
| JP | H04-225004 A | 8/1992 |
| JP | H10-060019 A | 3/1998 |
| JP | 2008-542507 A | 11/2008 |
| JP | 2009-536673 A | 10/2009 |
| WO | 200066640 A1 | 11/2000 |
| WO | 2006/130953 A1 | 12/2006 |
| WO | 2007/131646 A1 | 11/2007 |
| WO | 2010/123033 A1 | 10/2010 |
| WO | 2011/080128 A1 | 7/2011 |

OTHER PUBLICATIONS

International Search Report issued in corresponding International Application No. PCT/IB2019/039763, dated Apr. 2, 2020 (4 pages).
Written Opinion of the International Searching Authority issued in corresponding International Application No. PCT/IB2019/039763, dated Apr. 2, 2020 (7 pages).
International Search Report issued in corresponding international application No. PCT/IB2019/039762, dated Mar. 19, 2020 (4 pages).
Written Opinion of the International Searching Authority issued in corresponding international application No. PCT/IB2019/039762, dated Mar. 19, 2020 (8 pages).
"Safety Data Sheet for Stadis (R) 450," Innospec, Aug. 2, 2011 (17 pages).
Office Action issued in U.S. Appl. No. 16/729,032; dated Sep. 30, 2021 (9 pages).
Office Action issued in Chinese Application No. 201980087017.6; dated Jul. 1, 2023 (7 pages).
Notice of Reasons for Refusal issued in corresponding Japanese Application No. 2021-537859 dated Sep. 11, 2023 (9 pages).

* cited by examiner

CONTINUOUS FEED OF ANTISTATIC AGENT FOR GAS PHASE POLYMERIZATION PROCESS

BACKGROUND

Gas-phase polymerization is a common process for the effective preparation of a variety of polymers. In particular, homopolymers of light olefins, such as ethylene or propylene, and copolymers of ethylene and/or propylene and C4-C8 α-olefins may be efficiently produced by gas-phase polymerization.

Reactors for gas-phase polymerization generally comprise a fluidized bed composed of polymerizing polymer particles that are in the presence of a gas mixture. It is generally advantageous to have a bed in a fluidized state as it provides an extremely high surface area to maximize contact between the bed and the gas mixture. Additionally, the fluidized bed allows for complete mixing of the particulate phase and more frequent impacts between polymer particles and between the polymer particles and the reactor wall.

However, these frequent particle-particle and particle-wall impacts can result in the formation of electrostatic charges, which may result in attractive electrostatic forces between polymer particles and the reactor walls. This can result in the accumulation of solid matter in the reactor, often termed "sheeting" or "chunking". These phenomena may result in the solid masses of polymer negatively influencing the polymerization process by interfering with fluidization, affecting gas flow, blocking the outlet of product. Such results can decrease the efficiency and reliability of the polymerization and force a reactor shut-down for cleaning Such solid accumulations can be prevented by the use of antistatic agents, which may limit the formation of electrostatic charges and maintain the fluidized state of the reactor bed. Generally, the antistatic agents comprise a compound that contains a polar functional group such as a hydroxyl, ester, ether, alkyl, alkoxy, aryloxy, siloxy, silane or sulfonate group.

For instance, European Patent No. 1 255 783 B1 describes a method for introducing a carboxylate metal salt into a polymerization reactor to reduce the level of fouling and sheeting to maintain successful operation of a continuous polymerization process. U.S. Pat. No. 8,017,703 B2 describes a method for continuously feeding a polyglycerol ester into a polymerization reactor and inhibiting the production of inhomogeneities.

Further examples include U.S. Patent Publication No. 2012/0283369 A1, which describes a process for polymerization of olefins in the presence of an antistatic agent wherein the antistatic agent is a composition that comprises a polysulfone copolymer, a polymeric compound comprising basic nitrogen atoms, an oil-soluble sulfonic acid, and a solvent. U.S. Pat. No. 8,865,847 B2 describes a process for polymerizing ethylene and optionally an alpha olefin in the presence of an antistatic continuity additive, which comprises a fatty acid-derived dialkanolamide, an oil soluble sulfonic acid, and a dialkanolamine. European Patent Application No. 3 034 519 A1 describes a gas-phase process for olefin polymerization wherein an ester of a fatty acid with a polyol that is selected from the group consisting of C4-C6 sugar alcohols, dehydrated C4-C6 sugar alcohols, and C4-C6 monosaccharides, is used as antistatic agent.

However, it is known that most antistatic agents negatively impact the activity of olefin polymerization catalysts. This limits the amount of antistatic agent that can be used and, thus, results in a compromise between maintaining catalytic activity and effectively preventing solid accumulation in the reactor.

The use of antistatic agents for the production of polymers for food contact applications is further limited by restrictions that have been implemented by governmental regulatory bodies such as the European Commission and the U.S. Food and Drug Administration. Restricted compounds include ethoxylated amine, alkylbenzene sulfonic acid, random ethylene oxide/propylene oxide copolymer, and others.

Therefore, there exists a need for effective antistatic agents that not only prevent accumulation of polymer particles, but that also do not inhibit the catalytic activity of common polymerization catalysts and that are allowed to be used in highly-regulated applications, such as in the food and medical industries.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to methods that may include reacting an antistatic agent with at least one alkylaluminum to form an antistatic complex.

In another aspect, embodiments disclosed herein relate to methods of using an antistatic agent in a polymerization process. Such methods may include feeding the antistatic agent into the polymerization process and, subsequently, reacting the antistatic agent with at least one alkylaluminum.

In another aspect, embodiments disclosed herein relate to polymers that are produced by methods that may include feeding an antistatic agent into a polymerization process and, subsequently, reacting the antistatic agent with at least one alkylaluminum.

In another aspect, embodiments disclosed herein relate to antistatic complexes that are formed by methods that may include reacting an antistatic agent with at least one alkylaluminum.

Other aspects and advantages of the claimed subject matter will be apparent from the following description and the appended claims.

DETAILED DESCRIPTION

In one aspect, embodiments disclosed herein relate to methods for producing antistatic complexes. In one or more embodiments, methods may involve reacting an antistatic complex with at least one alkylaluminum. Another aspect of the disclosed embodiments relates to antistatic complexes that are produced by such methods.

In another aspect, embodiments disclosed herein relate to using an antistatic agent in a polymerization process. In one or more embodiments, methods in accordance with the present invention may involve reacting the antistatic agent with one or more compounds, such as alkylaluminums, to provide an antistatic complex that may be subsequently fed into the polymerization process. In other embodiments, methods in accordance with the present invention may involve first feeding the antistatic agent into the polymerization process and subsequently reacting the antistatic agent with one or more compounds, such as alkylaluminums, to provide an antistatic complex in situ. Another aspect of the disclosed embodiments relates to polymers produced by such methods.

Typical antistatic agents can be detrimental to polymerization processes as they can negatively impact the activity of polymerization catalysts. In such cases, this means that the amount of antistatic agent used must be restricted, limiting its efficacy. Methods in accordance with the present disclosure may use antistatic agents that have been reacted with alkylaluminums. Such methods may be advantageous over typical processes as they may provide an improved antistatic effect and may impede the activity of polymerization catalysts to a lesser degree than other antistatic agents. Further, methods in accordance with the present invention may use antistatic agents that are not restricted for use in, for example, food-contact applications.

Methods of Forming Antistatic Complexes

Methods in accordance with one or more embodiments of the present disclosure may comprise reacting at least one antistatic agent with at least one alkylaluminum to form an antistatic complex. In further embodiments, the antistatic complex may be used in a polymerization process.

In the method of one or more embodiments, an amount of the antistatic agent that is reacted is of a molar ratio ranging from about 1:1 to about 1:200, relative to an amount of the alkylaluminum. In other embodiments, an amount of the antistatic agent is of a molar ratio, relative to the amount of alkylaluminum, ranging from a lower limit of any of 1:1, 1:10, or 1:50 to an upper limit of any of 1:100, 1:150, or 1:200, where any lower limit can be used in combination with any upper limit.

Methods may use any alkylaluminum, or combinations thereof, but in some embodiments, the alkylaluminum may particularly be a trialkylaluminum. In one or more embodiments the alkylaluminum is one or more of triethylaluminum and triisobutyl aluminum.

Methods in accordance with one or more embodiments may use any antistatic agent that is known in the art. However, in the methods of many embodiments, the antistatic agent is particularly an ester of a fatty acid. For example, the ester of a fatty acid may be formed from saturated or unsaturated fatty acids having a length of C6 to C26 or from C12 to C22 in more particular embodiments. Such fatty acids may be reacted in particular embodiments with a polyol such as glycerol. However, it is also understood that the polyol may have one or more acids reacted therewith including but not limited to the fatty acid. For example, it is understood that the one or more of the ester groups formed will be with an organic acid that is not a fatty acid such as acetic acid, citric acid or other shorter organic acids. The ester of a fatty acid may be used in any suitable form, such as in a solid state or mixed with a carrier in a liquid state.

In one or more embodiments, methods in accordance with the present disclosure may use an antistatic agent that is approved by a governmental regulatory body for use in a particular application, such as in one or more of the food and medical industries. In one or more embodiments, the antistatic agent is one that is listed in 21 C.F.R. 178.3130 as being approved by the U.S. Food and Drug Administration for use in food-packaging materials. The ester of the fatty ester used in one or more embodiments may be, for example, Grindsted PGE O 80D or Grindsted PS432 (both marketed by DuPont) or Cithrol GMS90 (marketed by Croda).

Methods of forming an antistatic complex in accordance with one or more embodiments may involve optionally mixing an antistatic agent with the least one hydrocarbon compound before reacting the antistatic agent with the alkylaluminum. In some embodiments, the hydrocarbon compound may be a C3-C6 hydrocarbon and may be linear or branched. The hydrocarbon may be saturated and, in some embodiments, it may be selected from propane, butane, isobutene, pentane, isopentane, hexane, heptane, and the like. The hydrocarbon may be unsaturated and, in some embodiments, it may be selected from propene, butene, isobutene, pentene, isopentene, and the like. The hydrocarbon may particularly be in a liquid state.

In some embodiments, the antistatic agent is mixed with the hydrocarbon compound in a mass ratio ranging from about 1:10 to about 9:10, relative to an amount of the hydrocarbon compound. In some embodiments, the antistatic agent and hydrocarbon compound may be mixed together with either a continuous stirred-tank reactor or an in-line mixer.

Antistatic Complexes

Antistatic complexes in accordance with one or more embodiments of the present disclosure may be produced by any of the methods detailed above. In one or more embodiments, antistatic complexes may be formed by reaction of an antistatic agent and an alkylaluminum. In some embodiments, the antistatic complex is more effective at limiting the build up of static electricity and preventing particle accumulation than the unreacted antistatic agent. In some embodiments, the antistatic complex may be advantageous in that it does not inhibit the catalytic activity of a polymerization catalyst.

The antistatic complex of one or more embodiments may comprise an antistatic agent, one or more alkylaluminums, and at least one product of the reaction between the antistatic agent and the alkylaluminum. In embodiments where the antistatic agent is an ester of a fatty acid, said reaction products may comprise one or more alkylaluminums, which are different from the alkylaluminum that reacted with the antistatic agent, and/or compounds that may be defined as aluminum soaps, such as aluminum stearates.

The antistatic complex composition of one or more embodiments may further comprise at least one hydrocarbon compound. The hydrocarbon may be a C3-C6 hydrocarbon and may be linear or branched. The hydrocarbon may be saturated and, in some embodiments, it may be selected from propane, butane, isobutene, pentane, isopentane, hexane, heptane, and the like. The hydrocarbon may be unsaturated and, in some embodiments, it may be selected from propene, butene, isobutene, pentene, isopentene, and the like. The hydrocarbon may particularly be in a liquid state.

Using an Antistatic Agent in a Polymerization Process

The antistatic agents and complexes detailed above may be used in polymerization processes. In one or more embodiments, the antistatic complexes may limit electrical charging of polymer particles and prevent the resulting accumulation of solid masses of polymer that can negatively impact the efficiency and reliability of the polymerization.

Methods of using an antistatic agent in a polymerization process in accordance with one or more embodiments may involve at least a feeding step of feeding the antistatic agent (or antistatic complex) into a polymerization process and a step of reacting the antistatic agent with at least one alkylaluminum. The methods of one or more embodiments may additionally comprise a step of mixing the antistatic agent with a hydrocarbon compound. The order of these steps is not particularly limited, and may be any that are suitable for the intended process.

Figure 1:
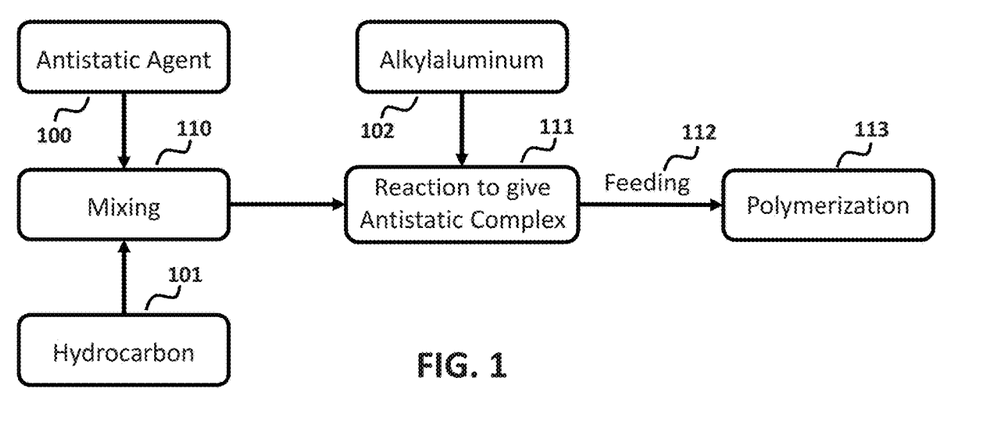
FIG. 1 is a flow diagram depicting a method of using an antistatic agent in a polymerization process, in accordance with one or more embodiments of the present invention.

A method of using an antistatic agent in a polymerization process, in accordance with one or more embodiments of the present disclosure, is depicted by FIG. 1. Therein, an antistatic agent 100 may be mixed with a hydrocarbon compound 101 in a mixing step 110. The resulting mixture may then be reacted with an alkylaluminum 102 to give an antistatic complex 111, as detailed above. A feeding step 112 may then feed the antistatic complex into a polymerization process 113. In some embodiments, the antistatic agent is not mixed with a hydrocarbon and is, instead, directly reacted with the alkylaluminum 102 to give an antistatic complex 111 before being fed 112 into the polymerization process 113.

Figure 2:
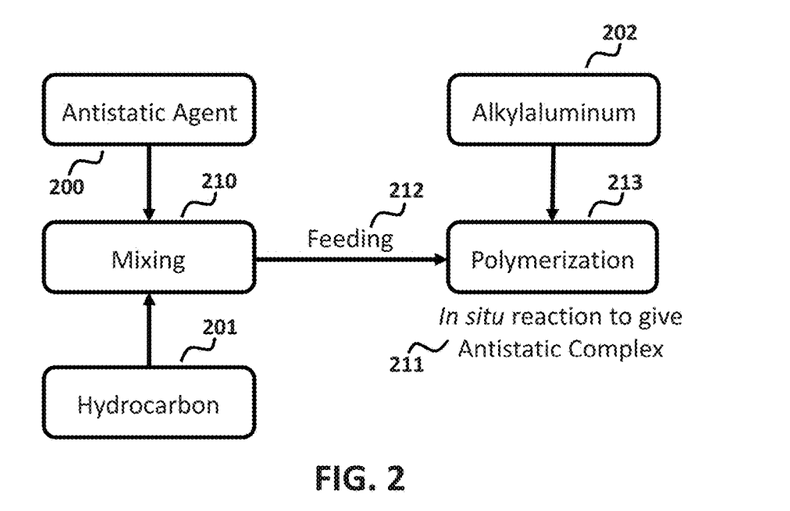
FIG. 2 is a flow diagram depicting a method of using an antistatic agent in a polymerization process, in accordance with one or more embodiments of the present invention.

A second method of using an antistatic agent in a polymerization process, in accordance with one or more embodiments of the present disclosure, is depicted by FIG. 2. Therein, an antistatic agent 200 may be mixed with a hydrocarbon compound 201 in a mixing step 210. The resulting mixture may then be fed 212 into a polymerization process 213. Subsequent reaction of the antistatic agent with an alkylaluminum 202 gives an antistatic complex 211 that is generated in situ. In some embodiments, the antistatic agent is not mixed with a hydrocarbon and is, instead, directly fed 212 into the polymerization process 213 before being reacted with the alkylaluminum 202 to generate an antistatic complex 211.

Feeding

The feeding step of methods in accordance with one or more embodiments may be performed using any suitable means known in the art. In particular embodiments, a valveless pump may be used. In some embodiments, the valveless pump may be a piston pump. In one or more embodiments the feeding step may be performed continuously during the polymerization process.

The feeding step may feed the antistatic complex or agent into any suitable stage of the polymerization process. In one or more embodiments, the antistatic complex or agent may be fed into the polymerization process at one or more of a gas phase reactor, a loop reactor, a discharge reactor line, a gas phase recycle line, a bag filter, or a heat exchanger, that are being used to perform the polymerization process.

In one or more embodiments, the feeding step is performed at a rate that is proportional to the rate of polymer production. In some embodiments the antistatic complex or antistatic agent is fed at a rate into the polymerization process in an amount ranging from about 5 to 1000 ppm by weight, relative to the rate of polymer production.

Polymerization Processes

The polymerization processes of methods in accordance with one or more embodiments are not particularly limited. However, in one or more embodiments, the polymerization process may particularly be a gas-phase polymerization.

In one or more embodiments, the polymerization process may polymerize at least one or more of ethylene, propylene, butene and hexene. In some embodiments, the polymerization process produces a homopolymer. The homopolymer produced by the method of one or more embodiments may be one of polypropylene and polyethylene. In some embodiments the polymerization process produces a copolymer. The copolymer produced by the method of one or more embodiments may be one of a polypropylene random copolymer, a polypropylene heterophasic copolymer, a polypropylene terpolymer, and linear low-density polyethylene.

In some embodiments the polymerization process may use either a metallocene or a Ziegler-Natta catalyst. The Ziegler-Natta and metallocene catalysts of one or more embodiments are not limited, at may be any Ziegler-Natta or metallocene catalyst known to one of ordinary skill in the art. The Ziegler-Natta catalyst may be a transition metal salt, wherein the transition metal is selected from group 4-12 metals. Some Ziegler-Natta catalysts may further be used with $MgCl_2$ and/or $TiCl_4$ and may comprise an internal electron donor selected from one or more of an aliphatic amine, amide, ester, ether, ketone, nitrile, phosphine, phosphoramide, thioether, thioester, aldehyde, alcoholate, or carboxylic acid. The metallocene catalyst of one or more embodiments may be a dichloride complex of the type $Cp*_2MCl_2$ were M is a transition metal such as Ti, Zr, and Hf, and Cp* is a substituted or unsubstituted cyclopentadienyl anion.

In one or more embodiments, the polymerization process may comprise the use of any suitable apparatus or equipment that is known in the art. In some embodiments, the polymerization process may comprise the use of one or more of a continually-stirred tank polymerization reactor, a loop polymerization reactor, a fluidized bed polymerization reactor, and a plug flow polymerization reactor.

In one or more embodiments, the polymerization process may use one or more gas phase reactors. In some embodiments, the polymerization process may use a gas phase reactor in combination with one or more of a slurry reactor and a bulk reactor.

Polymers

Polymers in accordance with one or more embodiments of the present disclosure may be produced by any of the methods detailed herein. As described above, the polymers of one or more embodiments may comprise monomers derived from one or more of ethylene, propylene, butene and hexene. In some embodiments, the polymer may be a homopolymer that, in some embodiments, may be one of polypropylene and polyethylene. In one or more embodiments the polymer may be a copolymer that, in some embodiments, may be one of a polypropylene random copolymer, a polypropylene heterophasic copolymer, a polypropylene terpolymer, and a linear low-density polyethylene.

EXAMPLES

The following examples are merely illustrative and should not be interpreted as limiting the scope of the present disclosure.

Example 1

The conductivity of a compound is an important property in determining whether the compound may be successfully used as an antistatic agent (or antistatic complex) in a polymerization process and can compensate for the electrostatic charges generated during the polymerization. The conductivity of Grindsted PS 432 (by Dupont) (herein "GE") and mixtures of triethylaluminum/Grindsted PS432 (TEAL/GE) and tri-isobutylaluminum/Grindsted PS432 (TIBAL/GE), in proportions of both 1:1 and 10:1 mol/mol were measured using a digital conductivity meter model 1152 provided by EMCEE Electronics.

GE comprises two main substances: an oleic acid monoester with oxybis(propanediol) (CAS No. 49553-76-6); and an acetic ester of monoglyceride (CAS No. 736150-63-3).

The antistatic complexes formed by the reaction of the oleic acid monoester with a complex of either oxybis (propanediol)/tri-isobutylaluminum or oxybis(propanediol)/tri-ethylaluminum were investigated by $^1$H NMR (Agilent 400 Mhz with DD2 console equipped with OneNMR probe). Samples were prepared in 5 mm tubes with deuterated cyclohexane. The oleic acid monoester with oxybis(propanediol) was diluted in a proportion of 10 mg to 0.6 mL of deuterated cyclohexane. The reactions of the oleic acid monoester with oxybis(propanediol)/tri-isobuthyl-aluminum and the oleic acid monoester with oxybis(propanediol)/tri-ethyl-aluminum were performed in a molar proportion of 1:1.

Figure 3:
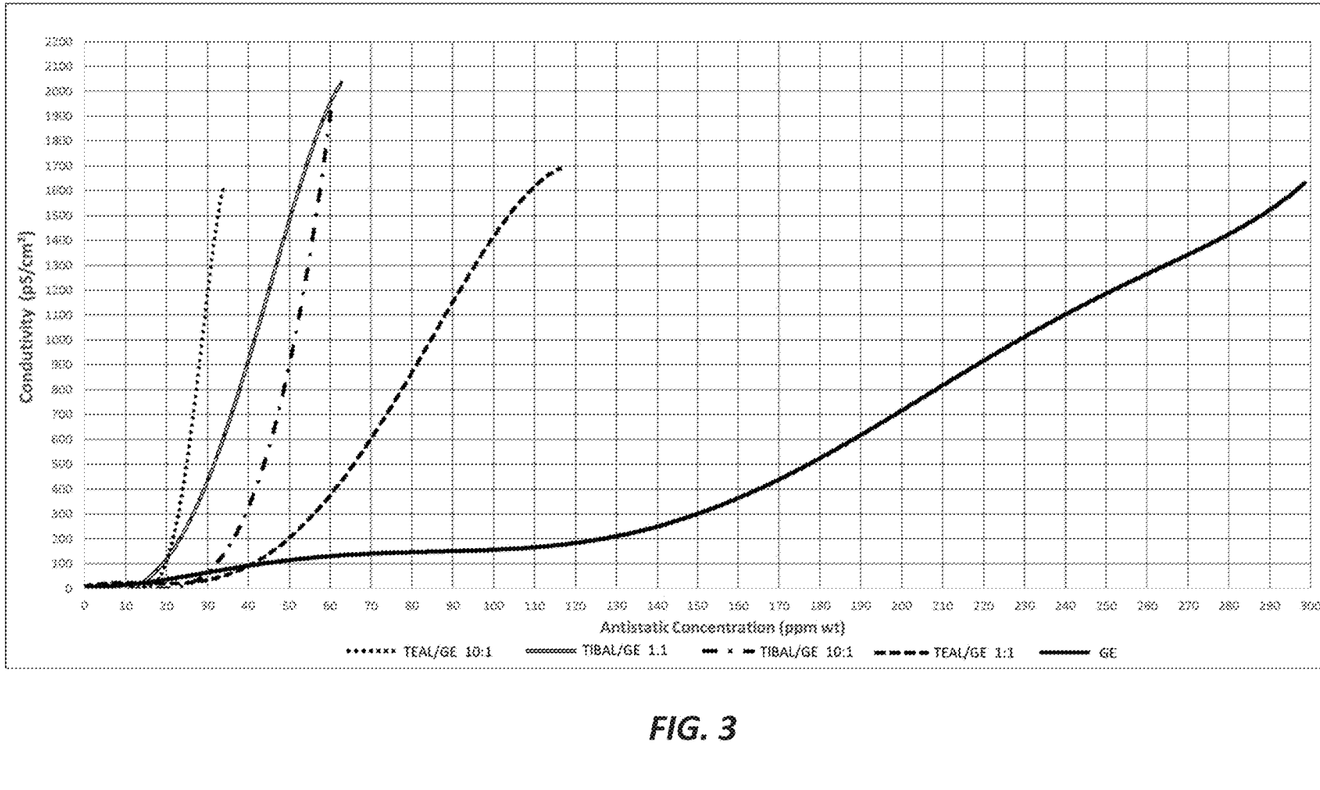
FIG. 3 depicts the conductivity of various antistatic agents and complexes.

Before starting the measurements, the reliability of the conductivity meter was confirmed by a measurement of hexane that provides a conductivity of zero. The solutions were prepared in a glove box proceeding the dilution of the antistatics in high purity hexane and this concentration is expressed in ppm wt. The pure Grindsted PS432 presented less conductivity than the mixture of Grindsted PS432/alkyl aluminum. The formation of an antistatic complex enhances the conductivity in as showed in FIG. 3.

The antistatic complex formed by the reaction of oleic acid monoester with oxybis(propanediol)/tri-isobutylaluminum reaction shows only one phase. The antistatic complex formed by the reaction of oleic acid monoester with oxybis (propanediol)/tri-ethylaluminum reaction shows two phases: a white solid and a liquid. These two phases were separated and 10 mg of each fraction were diluted in 0.6 mL of deuterated cyclohexane. The NMR spectrum of oleic acid monoester and oxybis(propanediol) were simulated in the software Predict provided by Universidad del Valle (Cali—Colombia) and the hydrogen peaks were identified.

Figure 4:
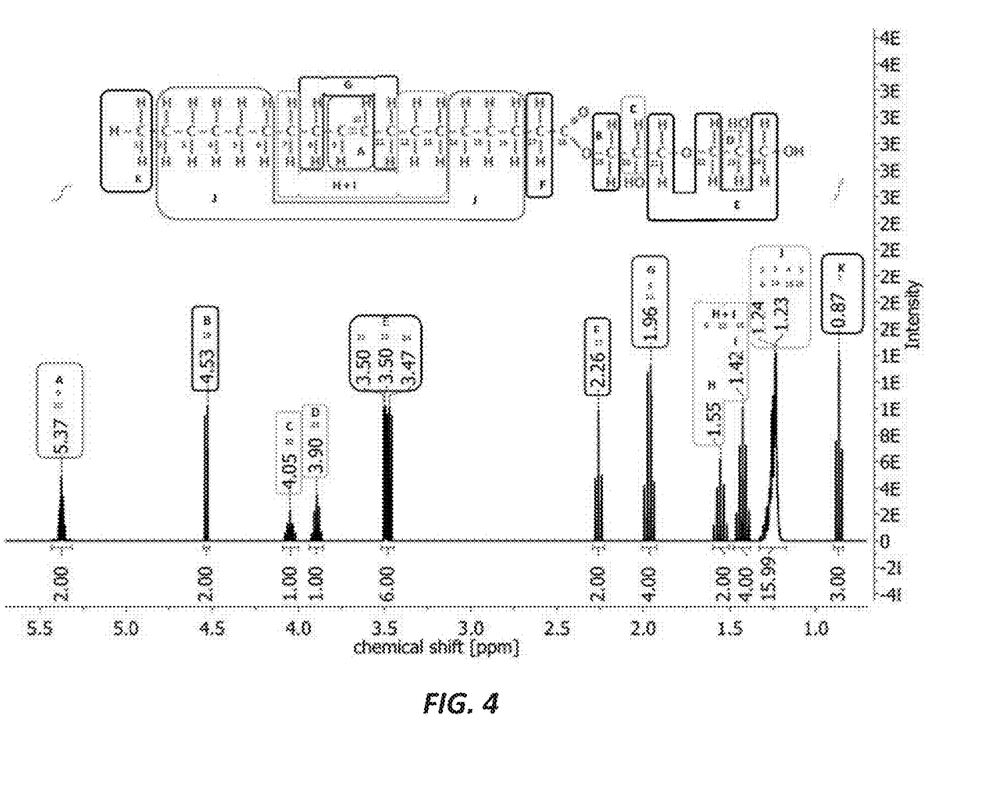
FIG. 4 depicts a simulated $^1$H NMR spectrum of oleic acid monoester and oxybis(propanediol).
Figure 5:
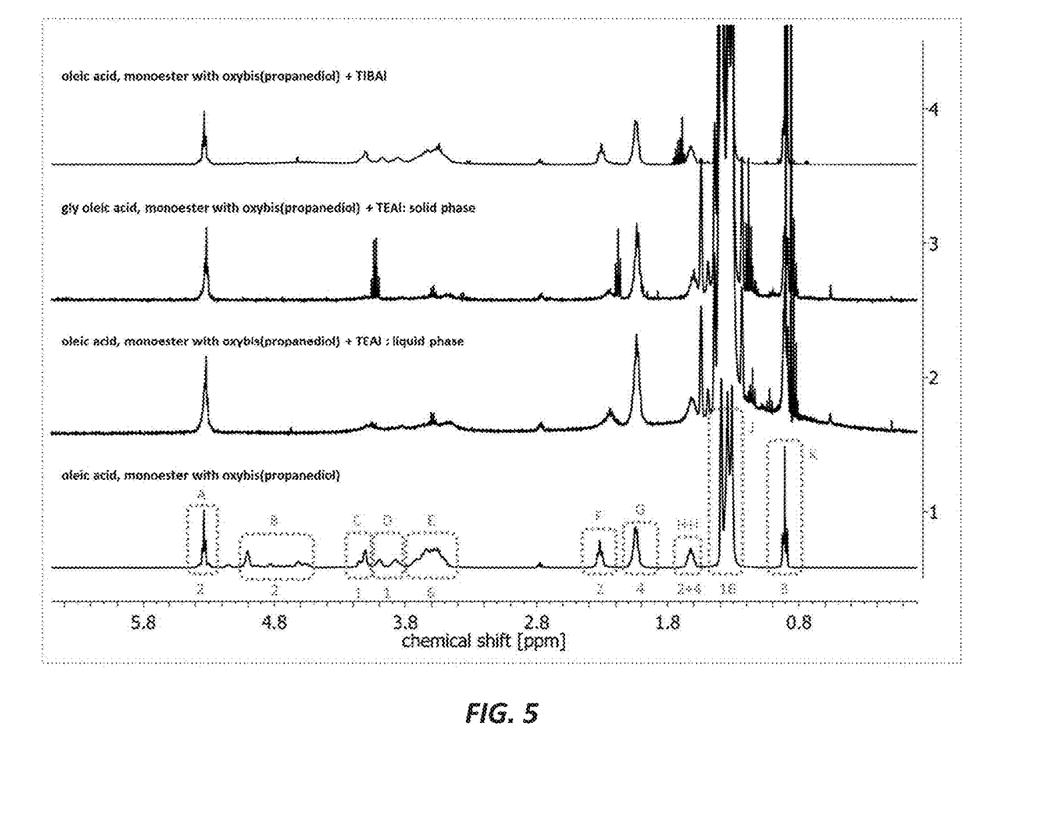
FIG. 5 depicts $^1$H NMR spectra of various antistatic complexes that comprise oleic acid monoester and oxybis (propanediol).

The simulated spectrum presented in FIG. 4 was used as basis to understand the NMR analysis showed in FIG. 5. The spectrum of the homogeneous liquid phase obtained by the reaction of oleic acid monoester with oxybis(propanediol)/tri-isobutylaluminum shows the formation of an antistatic complex. Different from groups A, C, D. E, F, G H, I and J, group B was not detected, indicating that the tri-isobutylaluminum probably reacts with the hydroxyl present on the group C. The spectrum of the solid phase obtained by the reaction of oleic acid monoester with oxybis(propanediol)/tri-ethylaluminum shows an antistatic complex formation, and groups B, C, D and E were not clearly detected. The homogeneous liquid phase does not contain group B, indicating the molecule of oleic acid monoester with oxybis (propanediol) degrade at this carbon. Groups C, D and E were detected in the liquid phase spectrum.

The conductivity analysis and NMR analysis indicates that the interaction of oxybis(propanediol)/tri-isobutylaluminum and oxybis(propanediol)/tri-ethylaluminum are different, resulting in different antistatic complexes.

Figure 6:
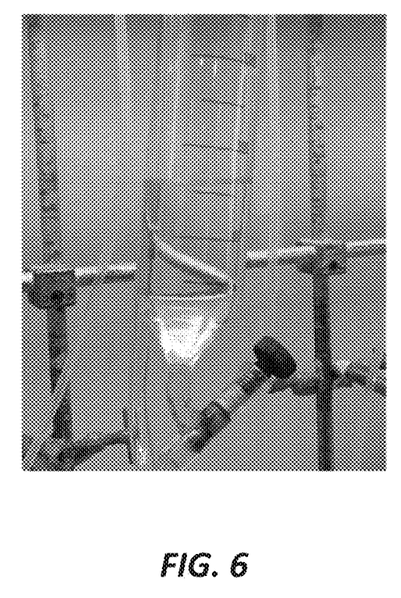
FIG. 6 depicts a photograph of the single phase that results from the reaction of oleic acid monoester and oxybis (propanediol) with tributylaluminum.
Figure 7:
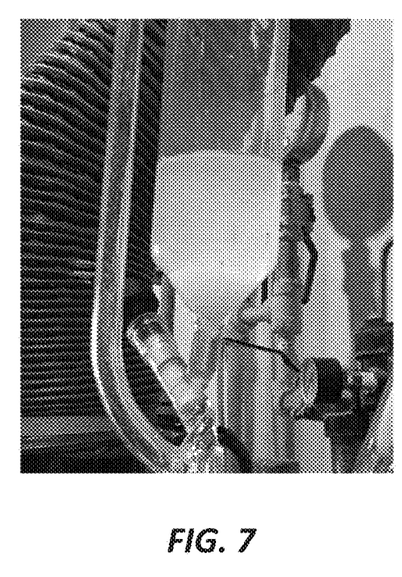
FIG. 7 depicts a photograph of the two phases that results from the reaction of oleic acid monoester and oxybis(propanediol) with triethylaluminum.

FIG. 6 illustrates the single phase produced by the reaction of oleic acid monoester with oxybis(propanediol)/tri-isobutylaluminum. FIG. 7 shows the two phases formed by the reaction of oleic acid monoester with oxybis(propanediol)/tri-ethyl-aluminum.

Example 2

36 kg/h of High Density Polyethylene (HDPE) is prepared by polymerizing ethylene, using a Ziegler-Natta catalyst, tri-ethyl-aluminum (TEAL) as cocatalyst and cyclohexyl-methyl-dimethoxysilane as external donor, in the presence of hydrogen as a molecular weight regulator, butene as density regulator, C3-C6 saturated hydrocarbon as inert diluent and Atmer163 (ethoxylated amine) as antistatic in a fluidized bed gas-phase reactor. In the fluidized bed gas phase reactor, the operative conditions of Table 1 are satisfied.

TABLE 1

| Conditions of Example 2 | |
|---|---|
| Al/Ti (molar) | 675 |
| Donor/Ti (molar) | 15.0 |
| Temperature (° C.) | 69.9 |
| Pressure (barg) | 20.9 |
| Ethylene (% mol) | 16.74 |
| Hydrogen (% mol) | 18.42 |
| Butene (% mol) | 0.020 |
| C3-C6 sat. (% mol) | 64.82 |

The total amount of Atmer163 introduced in the polymerization reactor was 930 ppm weight, based on the production rate.

The obtained HDPE has a Melt Flow Index at 190° C. of 12.0 (g/10 min) and density at 23° C. of 0.952 g/cc. In this polymerization run, a continuous discharge of HDPE is observed, and formation of lumps is prevented.

Example 3

The High Density Polyethylene was repeated according the similar operation condition of Example 2 to evaluate Grindsted PS432 (oleic acid, monoester with oxybis(propanediol)/acetic ester of monogliceride).

36 kg/h of High Density Polyethylene (HDPE) is prepared by polymerizing ethylene, using a Ziegler-Natta catalyst, tri-ethyl-aluminum (TEAL) as cocatalyst and cyclohexyl-methyl-dimethoxysilane as external donor, in the presence of hydrogen as a molecular weight regulator, butene as density regulator, C3-C6 saturated hydrocarbon as inert diluent and Grindsted PS432 (oleic acid, monoester with oxybis(propanediol)/acetic ester of monogliceride) as antistatic in a fluidized bed gas-phase reactor. In the fluidized bed gas phase reactor, the operative conditions of Table 2 are satisfied:

TABLE 2

| Conditions of Example 3 | |
|---|---|
| Al/Ti (molar) | 675 |
| Donor/Ti (molar) | 15.0 |
| Temperature (° C.) | 69.9 |
| Pressure (barg) | 21.0 |
| Ethylene (% mol) | 16.74 |
| Hydrogen (% mol) | 18.42 |
| Butene (% mol) | 0.022 |
| C3-C6 sat. (% mol) | 64.81 |

The total amount of Grindsted PS432 introduced in the polymerization reactor was 650 ppm weight, based on the production rate.

The obtained HDPE has a Melt Flow Index at 190° C. of 12.0 (g/10 min) and density at 23° C. of 0.953 g/cc.

In this polymerization run, a continuous discharge of HDPE is observed, and formation of lumps is prevented.

Table 3 presents the Grindsted PS432 performance compared to Atmer163, using tri-ethyl-aluminum as cocatalyst for the polymerization:

TABLE 3

| GE (Ex. 3) versus Atmer163 (Ex. 2) | |
|---|---|
| Antistatic | Concentration (ppm wt) |
| Atmer163 | 930 |
| Grindsted PS432 | 650 |

Example 4

21,000 to 32,000 kg/h of Polypropylene Heterophasic Copolymer (HECO) is prepared by polymerizing propylene-ethylene, using a Ziegler-Natta catalyst, tri-ethyl-aluminum (TEAL) as cocatalyst, and di-isopropyl-dimethoxysilane as external donor, in the presence of hydrogen as a molecular weight regulator and Atmer163 (ethoxylated amine) as antistatic in a fluidized bed gas-phase reactor. In the fluidized bed gas phase reactor, the following operative conditions are satisfied:

TABLE 4

| Conditions of Example 4 | |
|---|---|
| Al/Ti (molar) | 110 |
| Donor/Ti (molar) | 5.0 |
| Temperature (° C.) | 73-83 |
| Pressure (barg) | 8.7-14.1 |
| Ethylene/Propylene (molar) | 0.2-0.4 |
| Hydrogen/Ethylene (molar) | 0.05-0.25 |

The total amount of Atmer163 introduced in the polymerization reactor was 120 ppm weight, based on the production rate.

The obtained HECO has a Melt Flow Index at 230° C. of 1.0 to 20.0 (g/10 min) and ethylene bonded of 3.0 to 20.0 wt.

In this polymerization run, a continuous discharge of HECO is observed, and formation of lumps is prevented.

Example 5

The preparation of a polypropylene heterophasic copolymer (HECO) was repeated according the similar operation condition of Example 4 to evaluate the Grindsted PS432 (oleic acid, monoester with oxybis(propanediol)/acetic ester of monogliceride).

24,400 kg/h of Polypropylene Heterophasic Copolymer (HECO) is prepared by polymerizing propylene-ethylene, using a Ziegler-Natta catalyst, tri-ethyl-aluminum (TEAL) as cocatalyst and di-isopropyl-dimethoxysilane as external donor, in the presence of hydrogen as a molecular weight regulator and Grindsted PS432 (oleic acid, monoester with oxybis(propanediol)/acetic ester of monogliceride) as an antistatic in a fluidized bed gas-phase reactor. In the fluidized bed gas phase reactor, the operative conditions of Table 5 are satisfied.

TABLE 5

| Conditions of Example 5 | |
|---|---|
| Al/Ti (molar) | 110 |
| Donor/Ti (molar) | 5.0 |
| Temperature (° C.) | 73-83 |
| Pressure (barg) | 8.7-14.1 |
| Ethylene/Propylene (molar) | 0.2-0.4 |
| Hydrogen/Ethylene (molar) | 0.05-0.25 |

The total amount of Grindsted PS432 introduced in the polymerization reactor was 50 ppm weight, based on the production rate. The obtained HECO has a Melt Flow Index at 230° C. of 1.0 to 20.0 (g/10 min) and ethylene bonded of 3.0 to 20.0 wt. In this polymerization run a continuous discharge of HECO is observed, and formation of lumps is prevented.

Table 6 presents the Grindsted PS432 performance comparing with Atmer163, using tri-ethyl-aluminum as cocatalyst for the polymerization:

TABLE 6

| GE (Ex. 5) versus Atmer163 (Ex. 4) | |
|---|---|
| Antistatic | Concentration (ppm wt) |
| Atmer163 | 120 |
| Grindsted PS432 | 50 |

Example 6

50 kg/h of High Density Polyethylene (HDPE) is prepared by polymerizing ethylene, using a Ziegler-Natta catalyst, tri-isobuthyl-aluminum (TIBAL) as cocatalyst and tetrahydrofuran as external donor, in the presence of hydrogen as a molecular weight regulator, butene as density regulator, C3-C6 saturated hydrocarbon as inert diluent and Grindsted PS432 (oleic acid, monoester with oxybis(propanediol)/acetic ester of monogliceride) as antistatic in a fluidized bed gas-phase reactor. In the fluidized bed gas phase reactor, the following operative conditions are satisfied:

TABLE 7

| Conditions of Example 6 | |
|---|---|
| Al/Ti (molar) | 1018 |
| Donor/Ti (molar) | 20.0 |
| Temperature (° C.) | 80.0 |
| Pressure (barg) | 21.0 |
| Ethylene (% mol) | 14.59 |
| Hydrogen (% mol) | 18.96 |
| Butene (% mol) | 0.025 |
| C3-C6 sat. (% mol) | 66.43 |

The total amount of Grindsted PS432 introduced in the polymerization reactor was 607 ppm weight, based on the production rate. The obtained HDPE has a Melt Flow Index at 190° C. of 21.1 (g/10 min) and density at 23° C. of 0.958 g/cc. In this polymerization run, a continuous discharge of HDPE is observed, and the formation of lumps is prevented.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plusfunction clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method, comprising:
reacting an antistatic agent with at least one alkylaluminum to form an antistatic complex, wherein
the antistatic agent is an ester of a fatty acid,
the antistatic complex comprises the ester of the fatty acid, the at least one alkylaluminum, and
one or more reaction products between the ester of the fatty acid and the at least one alkylaluminum, and
the one or more reaction products comprise aluminum stearates.

2. The method of claim 1, further comprising:
feeding the antistatic complex into a polymerization process.

3. The method of claim 1, further comprising mixing the antistatic agent with at least one hydrocarbon compound before reacting the antistatic agent with the at least one alkylaluminum.

4. The method of claim 1, wherein the one or more reaction products further comprise alkylaluminums that are different from the at least one alkylaluminum that is reacted with the antistatic agent.

5. The method of claim 3, wherein the at least one hydrocarbon compound is a C3-C6 hydrocarbon.

6. The method of claim 3, wherein the at least one hydrocarbon compound is saturated.

7. The method of claim 3, wherein the at least one hydrocarbon compound is unsaturated.

8. The method of claim 1, wherein an amount of the antistatic agent is of a molar ratio ranging from 1:1 to 1:200, relative to an amount of the at least one alkylaluminum.

9. The method of claim 8, wherein an amount of the antistatic agent is of a molar ratio ranging from 1:10 to 1:150, relative to an amount of the at least one alkylaluminum.

10. The method of claim 9, wherein an amount of the antistatic agent is of a molar ratio ranging from 1:50 to 1:100, relative to an amount of the at least one alkylaluminum.

11. The method of claim 1, wherein the at least one alkylaluminum is triethylaluminum.

12. The method of claim 3, wherein an amount of the antistatic agent is of a mass ratio ranging from 1:10 to 9:10, relative to an amount of the at least one hydrocarbon compound.

13. The method of claim 3, wherein the antistatic agent and the at least one hydrocarbon compound are mixed with either a continuous stirred-tank reactor or an in-line mixer.

14. The method of claim 2, wherein the antistatic complex is fed into the polymerization process by a valveless pump.

15. The method of claim 2, wherein the polymerization process is a gas-phase polymerization.

16. The method of claim 2, wherein the polymerization process involves the use of either a metallocene or a Ziegler-Natta catalyst.

17. The method of claim 2, wherein the polymerization process polymerizes at least one or more of ethylene, propylene, butene, and hexene.

18. The method of claim 2, wherein the polymerization process produces a homopolymer.

19. The method of claim 18, wherein the homopolymer is one of polypropylene and polyethylene.

20. The method of claim 2, wherein the polymerization process produces a copolymer.

21. The method of claim 20, wherein the copolymer is one of polypropylene random copolymer, polypropylene heterophasic copolymer, polypropylene terpolymer and linear low-density polyethylene.

22. The method of claim 2, wherein the antistatic complex fed into the polymerization process at one or more of a gas phase reactor, a loop reactor, a discharge reactor line, a gas phase recycle line, a bag filter, or a heat exchanger, that are being used to perform the polymerization process.

23. The method of claim 2, wherein the feeding occurs continuously during the polymerization process.

24. The method of claim 2, wherein the antistatic agent is fed at a rate into the polymerization process in an amount ranging from 5 to 1000 ppm by weight, relative to a rate of polymer production.

25. A method of using an antistatic agent in a polymerization process, the method comprising:
feeding the antistatic agent into the polymerization process, wherein the antistatic agent is an ester of a fatty acid; and subsequently
reacting the antistatic agent with at least one alkylaluminum, wherein reacting the antistatic agent with the at least one alkylaluminum gives an antistatic complex that comprises the ester of the fatty acid, the at least one alkylaluminum, and one or more reaction products between the ester of the fatty acid and the at least one alkylaluminum, wherein the one or more reaction products comprise aluminum stearates.

26. The method of claim 25, further comprising: mixing the antistatic agent with at least one hydrocarbon compound before feeding the antistatic agent into the polymerization process.

27. The method of claim 26, wherein the at least one hydrocarbon compound is a C3-C6 hydrocarbon.

28. The method of claim 26, wherein the at least one hydrocarbon compound is saturated.

29. The method of claim 26, wherein the at least one hydrocarbon compound is unsaturated.

30. The method of claim 25, wherein an amount of the antistatic agent is of a molar ratio ranging from 1:1 to 1:200, relative to an amount of the at least one alkylaluminum.

31. The method of claim 25, wherein the at least one alkylaluminum is one of triethylaluminum and triisobutylaluminum.

32. The method of claim 25, wherein an amount of the antistatic agent is of a mass ratio ranging from 1:10 to 9:10, relative to an amount of the at least one hydrocarbon compound.

33. The method of claim 25, wherein the feeding occurs continuously during the polymerization process.

34. The method of claim 25, wherein the antistatic agent is fed at a rate into the polymerization process in an amount ranging from 5 to 1000 ppm by weight, relative to a rate of polymer production.

* * * * *